United States Patent [19]
Sultan

[11] Patent Number: 5,629,481
[45] Date of Patent: May 13, 1997

[54] MASS AIR FLOW MEASUREMENT SYSTEM AND METHOD

[75] Inventor: Michel F. Sultan, Troy, Mich.

[73] Assignee: General Motors Corporation, Detroit, Mich.

[21] Appl. No.: 523,985

[22] Filed: Sep. 6, 1995

[51] Int. Cl.⁶ .................................................... G01F 1/68
[52] U.S. Cl. ................... 73/204.18; 73/204.16
[58] Field of Search ................ 73/204.18, 204.11, 73/118.2, 861.95; 703/204.16

[56] References Cited

U.S. PATENT DOCUMENTS

| | | | |
|---|---|---|---|
| 4,080,821 | 3/1978 | Johnston | 73/27 R |
| 4,457,167 | 7/1984 | Sumal | 73/204.18 |
| 4,576,050 | 3/1986 | Lambert | 73/861.05 |
| 4,713,970 | 12/1987 | Lambert | 73/861.05 |
| 4,782,708 | 11/1988 | Harrington et al. | 73/861.05 |
| 4,934,189 | 6/1990 | Tanimoto et al. | 73/204.18 |
| 5,050,428 | 9/1991 | Shimomuta et al. | 73/204.18 |
| 5,086,650 | 2/1992 | Harrington et al. | 73/204.21 |
| 5,263,380 | 11/1993 | Sultan et al. | 73/204.26 |

FOREIGN PATENT DOCUMENTS

| | | |
|---|---|---|
| 1080762 | 12/1954 | France . |
| 2036322 | 6/1978 | United Kingdom . |

OTHER PUBLICATIONS

Breakthrough in Reverse Flow Detection–A New Mass Air Flow Meter Using Micro Silicon Technology, SAE Technical Paper Series No. 950433, International Congress & Exposition Detroit, Michigan, Feb. 27–Mar. 2, 1995.

*Primary Examiner*—Richard Chilcot
*Assistant Examiner*—Jewel V. Artis
*Attorney, Agent, or Firm*—Anthony Luke Simon

[57] ABSTRACT

A mass air flow measurement system comprising a sensing device located in an air flow providing an output signal relational to an mount of mass air flow past the device, wherein the sensing device has an inherent sensor response time constant and acts to low pass filter the output signal; and a first filter stage coupled to the output of the sensing device receiving the output signal, wherein the first filter stage is a high pass filter with a first filter time constant substantially equal to the sensor response time constant and provides, at a first filter output, a high pass filter output signal, wherein the first filter stage compensates for inaccuracies in the output signal caused by the inherent sensor response time when the air flow pulses cyclically at time periods on the order of the inherent sensor response time constant.

8 Claims, 7 Drawing Sheets

MASS AIR FLOW MEASUREMENT SYSTEM AND METHOD

This invention relates to a mass air flow measurement system and method.

BACKGROUND OF THE INVENTION

Many automotive vehicles with internal combustion engines use mass air flow meters that are located upstream of the internal combustion engine to measure the amount of air flowing into the engine. Responsive to the mass air flow information, the vehicle's engine controller controls fuel flow into the engine to reduce pollution emission levels, increase fuel economy and increase engine performance. To optimize system performance, it is desirable that the mass air flow meter respond quickly enough to supply information representative of the measure of mass air flow into each cylinder of the engine.

One challenge that occurs in attempting to measure mass air flow into the engine is especially prevalent in four cylinder engines. This challenge is air pulses in the intake duct caused by the engine valving during intake and exhaust strokes. Four cylinder engines can generate oscillations of significant amplitude in the intake air flow and engine valve overlap can cause brief periods of flow out of the cylinder intake manifold, causing brief periods of reverse flow in the intake ducts. This bi-directional mass air flow pulsation can cause significant mass air flow meter errors if the mass air flow meter and/or the measurement technique are insensitive to flow direction. Thus, it is advantageous to have a bi-directional mass air flow sensing device especially to control four cylinder engine fueling using mass air flow sensing strategies.

A mass air flow sensor suitable for batch fabrication and associated control circuitry have been described in U.S. Pat. Nos. 4,576,050, 4,713,970, 4,782,708, 5,086,650, and 5,263,380, all assigned to the assignee of this invention.

FIG. 1 illustrates schematically a top view of a typical bi-directional mass air flow sensing device according to these prior patents. The sensing device 14 is centered on a planar substrate such as silicon chip and consists of a central heater 16 and two temperature sensitive resistors (thermistors) 18, 20 located equidistantly upstream and downstream from the heater 16. The two thermistors 18, 20 are at equal temperature in zero-flow conditions but are at different temperatures when fluid flows past sensing device 14. More particularly, the electronic circuit 26 causes heater 12 to generate heat that propagates more toward the downstream thermistor 18, 20 than the upstream thermistor 20, 18 resulting in a positive temperature difference between the downstream and upstream thermistors 18, 20. The sensor output is proportional to the instantaneous temperature difference between thermistors 18 and 20 and increases monotonically with flow magnitude. A negative difference between the downstream and upstream thermistors 18 and 20 occurs during reverse flow conditions. Thus when the sensing device 14 is placed in flow path 12 in duct 10, it is responsive to flow in both the direction indicated by arrow 22 and the reverse direction indicated by arrow 24.

Bi-directional mass air flow sensors based on downstream minus upstream temperature measurements detect reverse flow conditions more accurately than typical sensors based on hot wire measurements. These sensors, however, have a limited frequency bandwidth that is dictated by the physical layout of the sensor and the substrate material selection. The limited bandwidth may introduce errors into the sensor measurement signals that may be significant under high frequency pulsations of air flow through the duct.

In upper frequencies, for example, frequencies over 55–60 Hz, error integrated over a full cycle of air flow pulse may reach over 10% of the actual mass air flow. What is desirable is a sensor whose integrated error is below 10% for a frequency range extending from zero to over 100 Hz because some engines can, under certain operating conditions, create back flow pulses of air through the duct at frequencies in excess of 100 Hz. When a typical prior art bi-directional device according to FIG. 1 measures air pulses having frequencies above 100 Hz, the resulting measurement signals yield errors significantly larger than 10% of the actual mass air flow value, which is unacceptable for precise mass air flow measurement determination.

SUMMARY OF THE PRESENT INVENTION

Advantageously, this invention provides a mass air flow sensor system and method for reducing mass air flow sensor measurement error especially in higher frequency pulsating flow conditions.

Advantageously, this invention recognizes that a bi-directional upstream minus downstream temperature flow sensor has an inherent time constant based on the structure and configuration of the sensor. For air flow with pulses having cycle times approaching and below the sensor time constant, the sensor output both lags the actual amount of air flow through the duct and has an average that is below the actual average that an accurate air flow measurement would yield. The error of the average becomes greater as the frequency of the air flow pulses rises.

Advantageously, this invention sets forth a compensation system and method that compensates for the effects on the sensor output signal introduced by the inherent time constant of the sensor.

Advantageously, according to an example implementation of this invention, the compensation system and method uses a high pass filter with a time constant set substantially equal to the time constant of the sensor to effectively amplify high frequency portions of the sensor output signal, thus compensating for phase lag in the sensor output and insensitivity to the high frequency air pulses and thus eliminating the difference between the average air flow measured by the sensor and the actual average air flow through the duct. Further, to prevent the high pass filter from increasing the noise-to-signal ratio by also amplifying sensor noise, a low pass filter is implemented with a time constant substantially smaller than that of the high pass filter or the sensor to filter out signal noise, thus yielding a sensor output signal that is robust over a large frequency range and reduces sensor noise output over the large frequency range, increasing sensor accuracy without impairing sensor precision.

BRIEF DESCRIPTION OF THE DRAWINGS

The present invention will now be described, by way of example, with reference to the accompanying drawings in which.

DETAILED DESCRIPTION OF THE INVENTION

Figure 2:
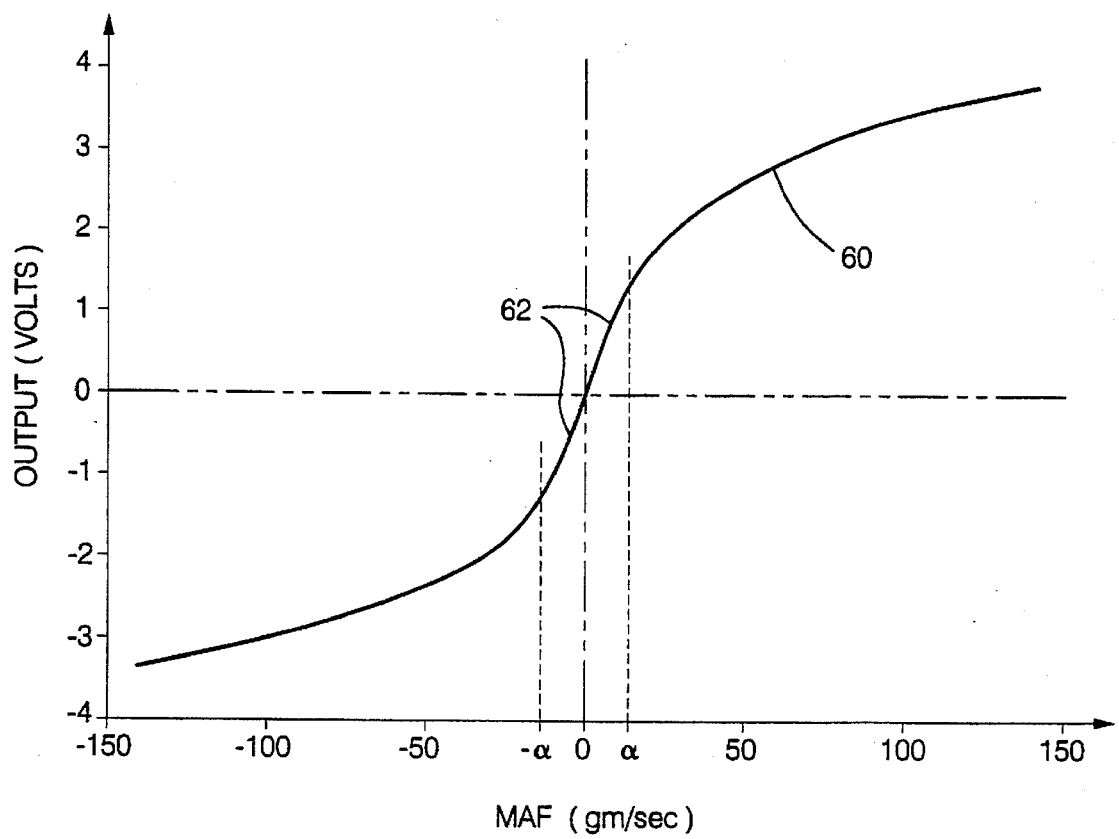
FIG. 2 illustrates a general calibration curve for a sensor for use with this invention.

Referring now to FIG. 2, the calibration curve 60 illustrates the steady state calibration curve for a typical batch manufacturable downstream minus upstream air flow sensor. The trace 60 illustrates the non-linearity of the calibration curve, which may be approximated by the following logarithmic relationship:

$$V_{out} = \alpha \cdot \text{sign}(Q) \cdot \ln(1 + \beta \cdot |Q|), \quad (1)$$

where $V_{out}$ is the output voltage, Q is the mass air flow and $\alpha$ and $\beta$ are constants that vary with the mass air flow sensing device.

Figure 3:
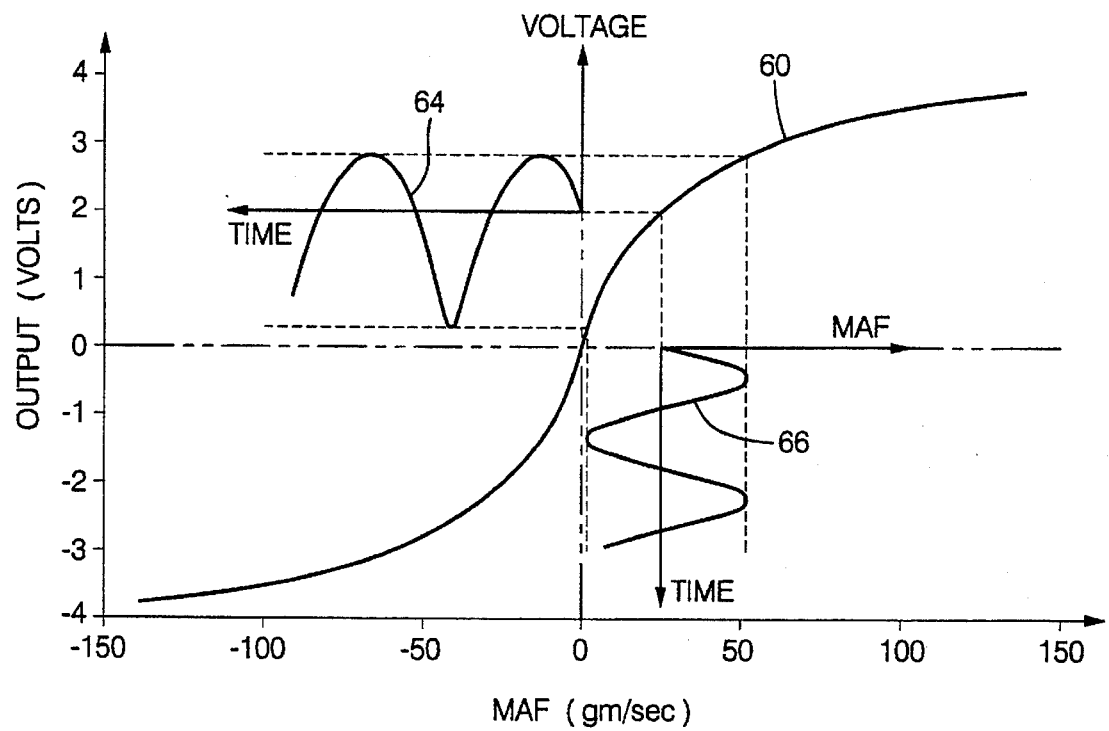
FIG. 3 illustrates an ideal output of a sensor for use with this invention.

Assuming now a slowly varying harmonic mass air flow with a constant average value represented by the equation:

$$Q = Q_{dc} + Q_{ac} \cdot \cos(\omega_0 t), \quad (2)$$

an example such signal is represented by the measurement versus time plot, trace 66, in FIG. 3. The resultant voltage output of the sensor is represented by trace 64, which shows that the voltage output signal is not a pure harmonic waveform, but rather is a distorted signal with high frequency content at multiples of a fundamental frequency. This distortion is generated by the inherent non-linearity of the sensor, as exhibited by the calibration curve 60. Using calibration curve 60, the voltage output signals, such as represented by trace 64, can easily be converted in the engine control module to a pure harmonic signal to be representative of the mass air flow represented by trace 66. This conversion can result in precise mass air flow measurement information if the actual mass air flow signal varies slowly as compared to the time constant of the sensor.

As the pulsation frequency becomes comparable to or exceeds the bandwidth of the sensor, the sensor output signal reflects only a portion of the mass air flow information past the sensor because the sensor itself performs a low pass filter function. Thus, the voltage output from the sensor does not accurately represent high frequency components of mass air flow pulses past the sensor, but represents an attenuated response to the high frequency components.

Assuming that the sensor acts as a simple first order low pass filter, the Laplace Transform for the output voltage may be approximated by:

$$V_{out}(s) \cong \frac{\alpha \cdot \text{sign}(Q(s)) \cdot \ln(1 + \beta \cdot |Q(s)|)}{1 + s \cdot \tau_{sensor}} \equiv \frac{F(Q(s))}{1 + s\tau_{sensor}} \quad (3)$$

Figure 4:
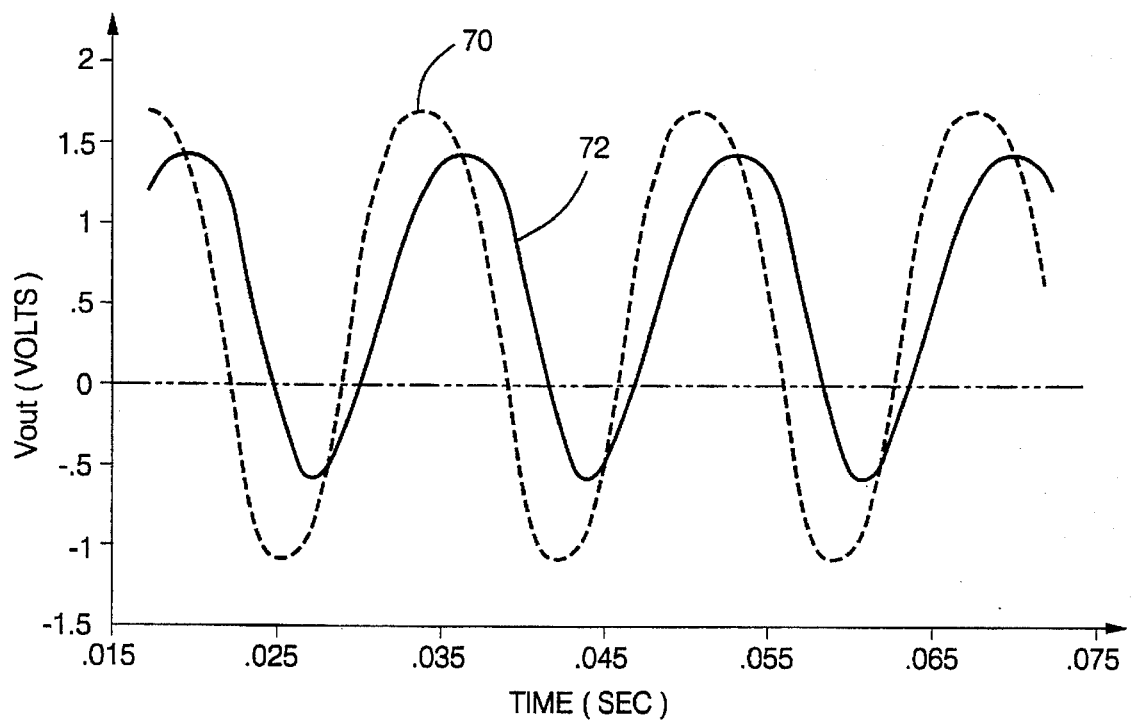
FIG. 4 illustrates ideal and actual mass air flow sensor output signals.

FIG. 4 illustrates that the predicted shape (trace 72) of the voltage output for an actual sensed mass air flow having a harmonic at 60 Hz using a sensor with a time constant of 2.7 milliseconds. As can be seen, the voltage output from the sensor 72 lags behind the ideal voltage output 70 and the higher frequency content of the output voltage trace 72 is filtered more substantially than the ideal signal 70.

Figure 5:
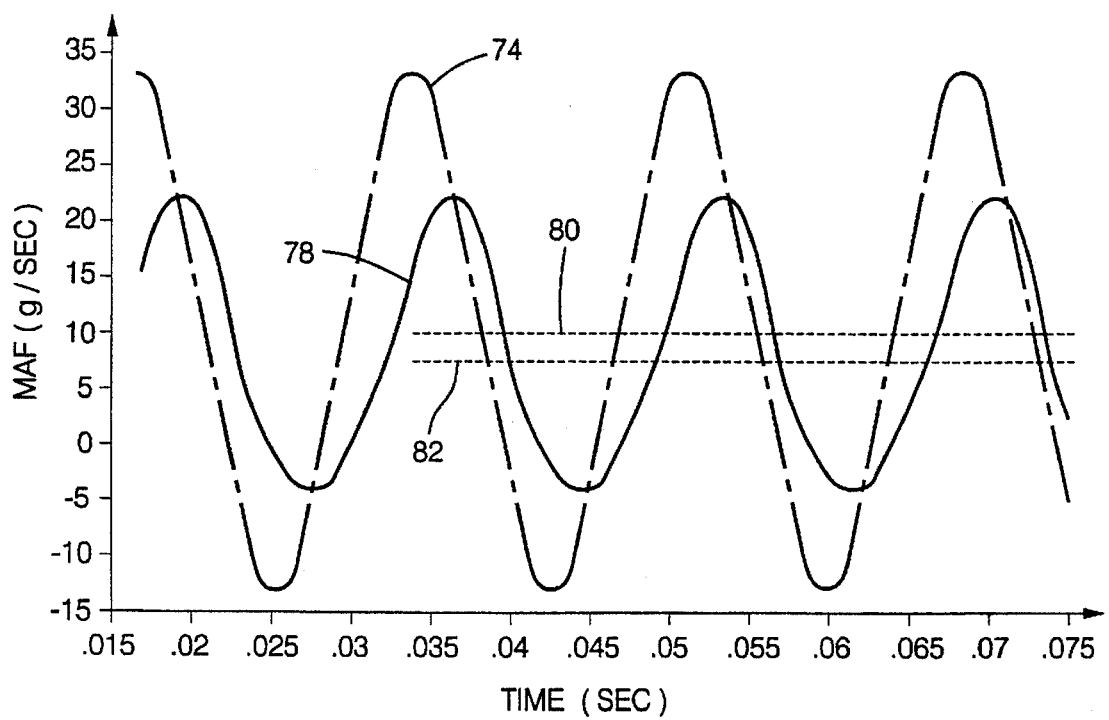
FIG. 5 illustrates actual and sensed mass air flow measurement in real time and in average.

Referring now to FIG. 5, trace 78 illustrates the mass air flow measurement computed using the sensor output (trace 72, FIG. 4) and the steady state calibration curve 60 (FIG. 2). Trace 78 was confirmed through both simulation and experimental results. Trace 74 represents the actual amount of mass air flow through the duct. Trace 78 lags the actual mass air flow, trace 74, by about 0.015 seconds and the average value of trace 78, represented by trace 82, is about 3 g/s (30%) below the average mass air flow 80.

FIG. 5 illustrates that for an air flow pulsing at 60 Hz, the sensor output substantial lags the actual mass air flow and the average measurement signal resulting from the sensor is only a partial percentage of the actual mass air flow. In the example shown, the measured value is only 70% of the true value. The lag and low average of the sensor output are due to the attenuation of high frequency signals by the sensor's inherent low pass filter function caused by the inherent time constant of the sensor. Also shown in FIG. 5 is that the amplitude of a measurement signal 78 is less than that of the actual mass air flow 74 and is distorted as compared to the actual mass air flow 74.

The most significant of all the above effects is that the sensed average 82 is lower than the actual average 80 because the engine control module will responsively command fuel to the engine in insufficient amounts, resulting in a lean air/fuel ratio operating condition, which may be undesirable for many reasons.

Figure 6:
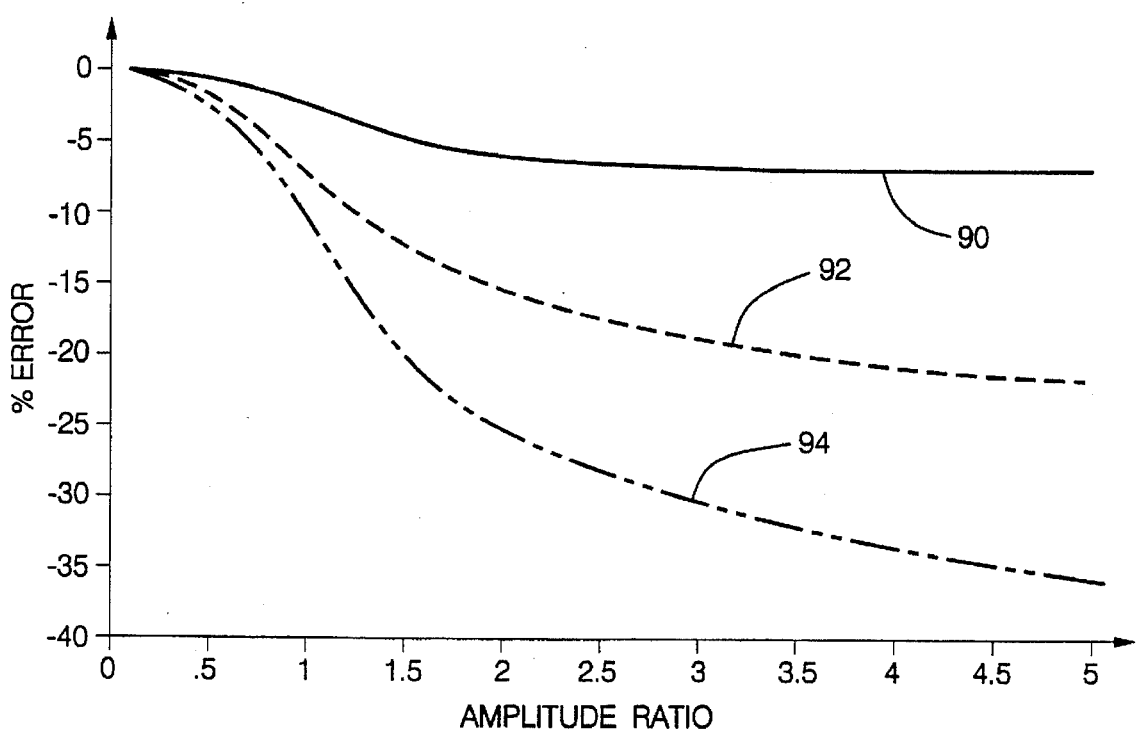
FIG. 6 illustrates sensor error in relation to air flow pulsation amplitude and frequency.

The percentage error of the average of the mass air flow measurements depends on the magnitude of the actual average flow ($Q_{dc}$) and the frequency and amplitude of the flow pulsations ($Q_{ac}$). FIG. 6 illustrates the percent error (vertical axis) of three average mass air flow measurement signals in response to 10 g/s of air flow pulsing at three different frequencies as a function of amplitude ratio ($Q_{ac}/Q_{dc}$) (horizontal axis). The sensor used has a 2.7 millisecond time constant and is placed in the main air flow duct. Trace 90 illustrates the percent error for the air flow pulsing at 20 Hz, trace 92 represents the percent error for the air flow pulsing at 40 Hz, and trace 94 represents the percent error for the air flow pulsing at 60 Hz. The graph shows the relationship between error and pulsation frequency and trace 94 shows that for an amplitude ratio of 5, the measurement error is −36%.

Some improvements to the results in FIGS. 5 and 6 can be obtained by constructing the sensing element so that it has a faster response, meaning a lower time constant, and also so that it has a more linear response. Achieving a fast response can be made with smaller size elements and smaller spacing between the heating and temperature detectors to reduce the thermal capacity of the sensor. The thermal capacity may also be reduced by selecting substrate materials with larger thermal diffusivity. Making such adjustments may require tradeoffs in sensor durability and may raise output signal errors due to the effect of heat propagation through the sensor substrate.

Figure 7:
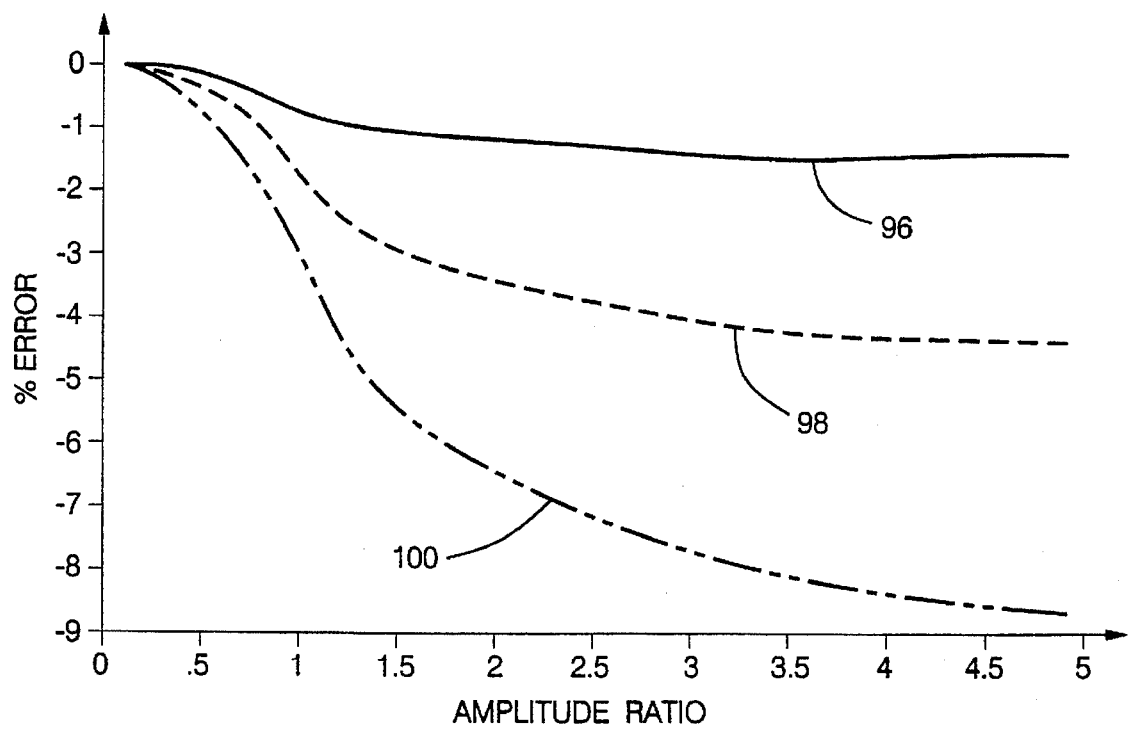
FIG. 7 illustrates reduced sensor error using faster response time sensors.

FIG. 7 illustrates simulations of the measurement percent error as a function of amplitude ratio for a sensing device with a 1 millisecond time response. Trace 96 represents the error in response to 10 g/s of air flow with a 20 Hz pulsation, trace 98 represents the error in response to air flow with a 40 Hz pulsation and trace 100 represents the error response to air flow with a 60 Hz pulsation. Trace 100 shows that for 10 g/s of air flow pulsing at 60 Hz with an amplitude ratio of 5, the measurement error is only approximately −8.7%. This compares to −36% for the sensor with a 2.7 ms time constant.

One way to linearize the sensor response and further reduce sensor error is to place the sensor in a bypass duct where a percentage (for example, approximately 10%) of the air flow through the main duct flows through the bypass duct and past the sensor. The advantage of this can be seen with respect to FIG. 2. Trace 60 in FIG. 2 plots the sensor response from −140 to 140 g/s of mass air flow and shows that the response is highly nonlinear. However, if the sensor is operated only in the range between −a to a, for example −14 to 14 g/s, it remains in the region 62, which is much closer to being linear than the entire operating range of the sensor. The result is that the coefficient β (equation 3) is reduced by a factor of 10.

Figure 8:
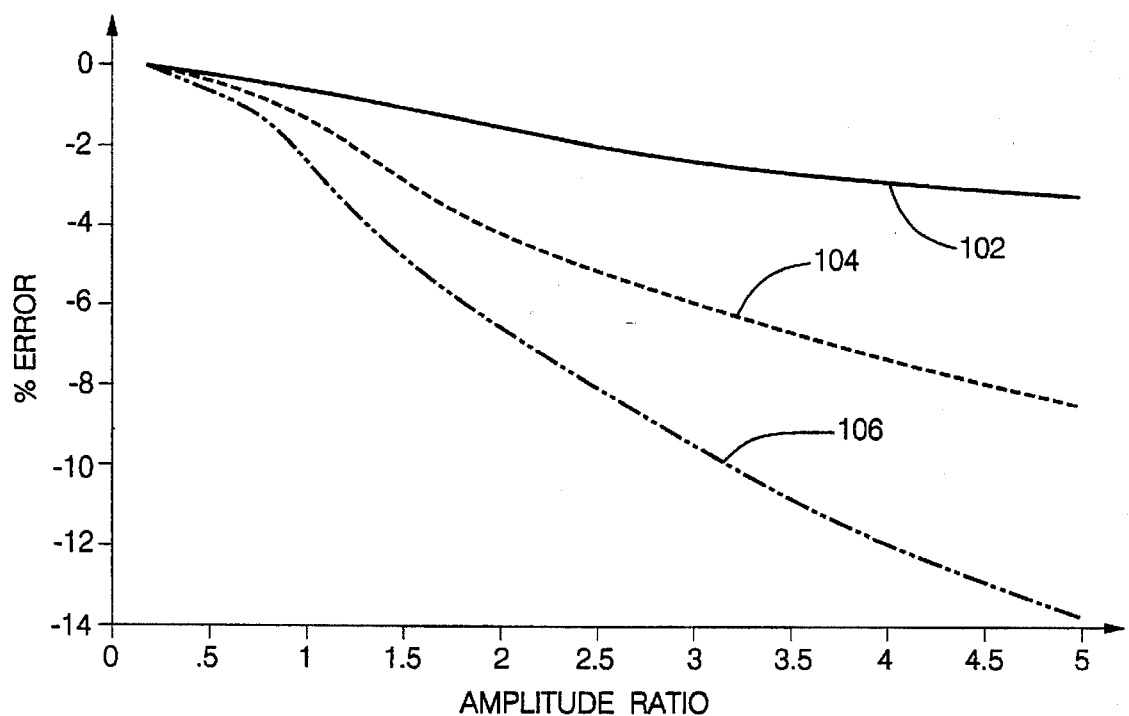
FIG. 8 illustrates reduced sensor error obtainable by operating the sensor in a linear region.

FIG. 8 illustrates the benefit of operating a sensor with a 2.7 ms time constant in the linear operating region. Traces 102, 104 and 106 illustrate the percent error for an average measurement of 10 g/s air flow pulsing at 20 Hz, 40 Hz, and 60 Hz, respectively, over the amplitude range of 0–5. The figure shows that 10 g/s of mass air flow pulsing at 60 Hz with an amplitude ratio of 5 has an error of only −13.5%, compared to the −36% for FIG. 6. By using a sensor with a faster response time and by operating the sensor in the linear region, errors can be reduced even further than is shown in FIGS. 7 and 8 separately. For example, for 10 g/s of mass air flow pulsing at 60 Hz with an amplitude ratio of 5, simulations show that the percent error in the measurement signal is reduced to −3.6%.

The above suggestions may not be suitable for all implementations. For example, for some air flow implementations, environmental constraints may prevent use of a sensor having a time constant as small as 1 millisecond or may require a larger output signal range than is obtained in the linear operating region of the sensor. Thus, according to this invention, an electronic compensation system and method are introduced to reduce both real time and integrated errors in the sensor output signal.

Rewording equation 3, the sensed mass air flow can be represented by:

$$Q_{sensed}(s) = F^{-1}(V_{out}(s)) = F^{-1}\left(\frac{F(Q(s))}{1+s\tau_{sensor}}\right) \quad (4)$$

Equation (4) illustrates the effect of the inherent low pass filter function of the sensor on the sensed mass air flow. As equation (4) shows, when $\tau_{sensor}$ is in the range of or larger than the mass air flow pulsation period, the detrimental effect on the measured mass air flow signal is prominent. To make the sensed mass airflow signal more accurate, this invention minimizes the effect of $\tau_{sensor}$ on the sensor output, even when $\tau_{sensor}$ is on the order of or larger than the expected pulsation periods of an internal combustion engine intake system, for example 2.7 ms or greater.

Figure 1:
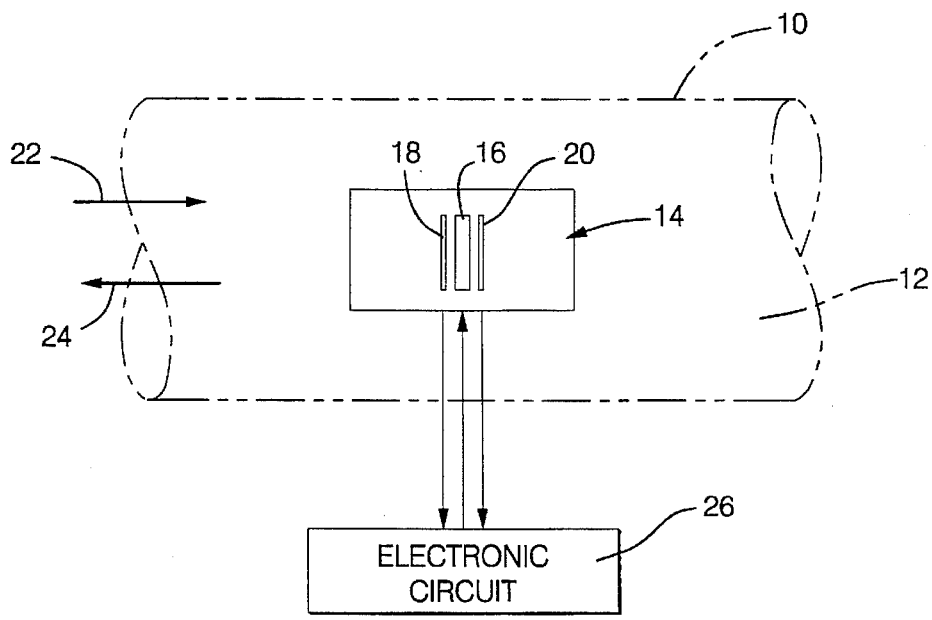
FIG. 1 illustrates schematically a prior art sensor and circuit for use with this invention.
Figure 9:
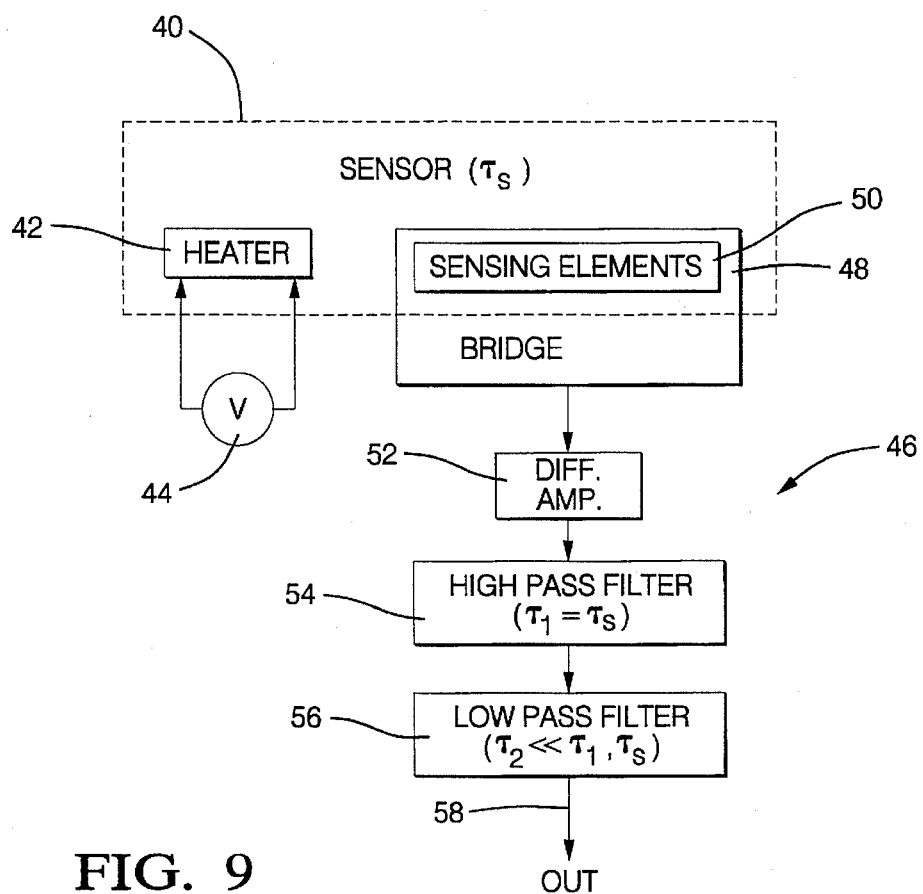
FIG. 9 illustrates a system and method of electronic compensation for reducing sensor error.

More particularly, referring now to FIG. 9, the system and method for electronic compensation according to this invention is shown. The sensor represented by reference 40 includes the heating element 42 that generates heat when it receives power from current source 44. The sensing elements represented by reference 50 of the sensor 40 are part of a bridge circuit 48 that provides an output to a differential amplifier 52, whose output signal is relational to the difference between the temperature sensed by the upstream and downstream thermistors. According to this invention, the output of the differential amplifier 52 is provided to a high pass filter 54 that has a zero with a time constant $\tau_1$, where $\tau_1 \cong \tau_{sensor}$. The high pass filter 54 enters the zero, $1+s\tau_1$ into the equation for the output signal response. By setting the time constant of the high pass filter substantially equal to the time constant of the sensor, the zero of the high pass filter cancels out the pole of the sensor, eliminating the low pass filtering effect of the sensor.

A disadvantage of the high pass filter is that it passes sensor noise, effectively increasing the sensor noise to signal ratio. To compensate for the increased noise to signal ratio, a low pass filter 56 is introduced after the high pass filter to provide a pole $1+s\tau_2$ into the circuit where $\tau_2$ is the time constant of the low pass filter. In general, $\tau_2$ is much smaller than $\tau_1$ and $\tau_{sensor}$, for example, in the range of approximately $0.1 \times \tau_1$ (typical examples of $\tau_2$ may fall within the range of 0.1–0.6 ms). Thus, the low pass filter 56 effectively filters out the noise passed through the high pass filter 54, decreasing the noise to signal ratio and providing a more useful sensor output signal.

With the high and low pass filters according to this invention in the sensor output circuit, the compensated output signal on line 58 can be written as:

$$V_{comp}(s) = \frac{F(Q(s))}{1+s\tau_{sensor}} \cdot \frac{1+s\tau_1}{1+s\tau_2} \cong \frac{F(Q(s))}{1+s\tau_2},$$

$(\tau_1 \cong \tau_{sensor})$.

As can be seen, when $\tau_1 \cong \tau_{sensor}$ the pole of the sensor is canceled by the $\tau_1$ zero of the high pass filter eliminating the sensor response from the equation. Thus, the overall time constant of the system is $\tau_2$, which can be made small by properly selecting the low pass filter design. The compensated voltage output is proportional to:

$$\frac{F(Q(s))}{1+s\tau_2},$$

and when $\tau_2$ is very small, is approximately equal to $F(Q(s))$.

Figure 10:
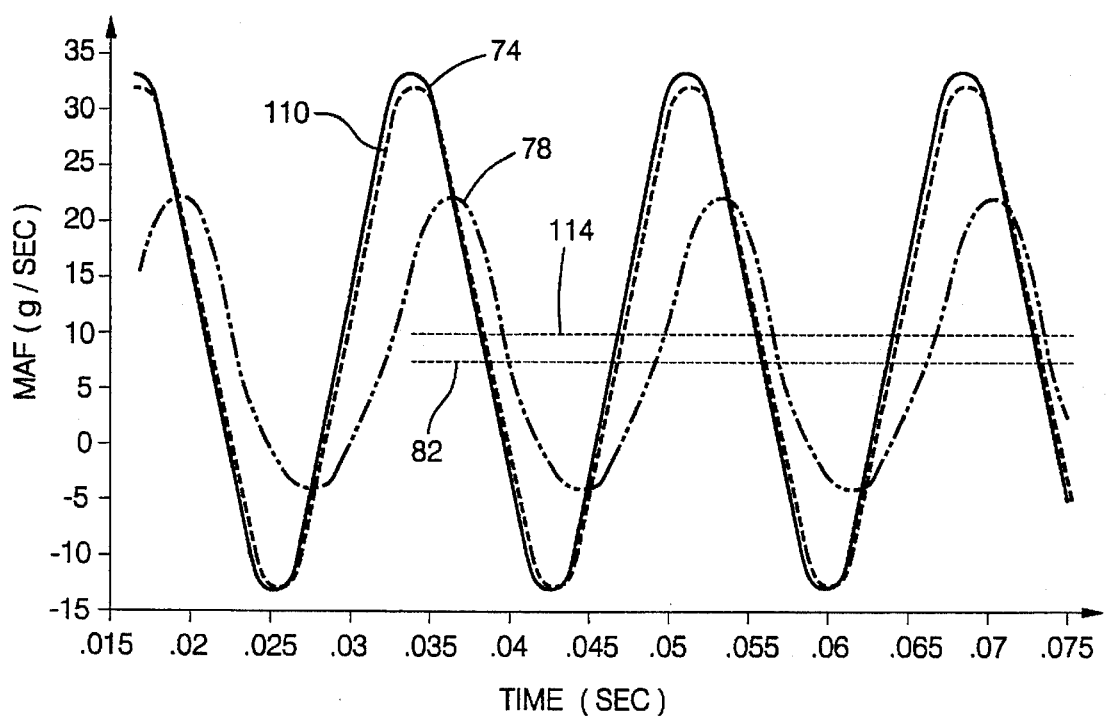
FIG. 10 illustrates the results of the electronic compensation of FIG. 9.

Referring now to FIG. 10, traces 74, 78 and 82 are again shown representing the actual mass air flow, mass air flow sensed by the sensor and the average sensor output, respectively. Trace 110 represents the compensated voltage output, which more closely matches the actual mass air flow past the sensor and trace 114 represents the average mass air flow represented by trace 110. The figure shows that the compensated average mass air flow, trace 114, is closer to the actual 10 g/s of mass air flow than the uncompensated average 82.

Figure 11:
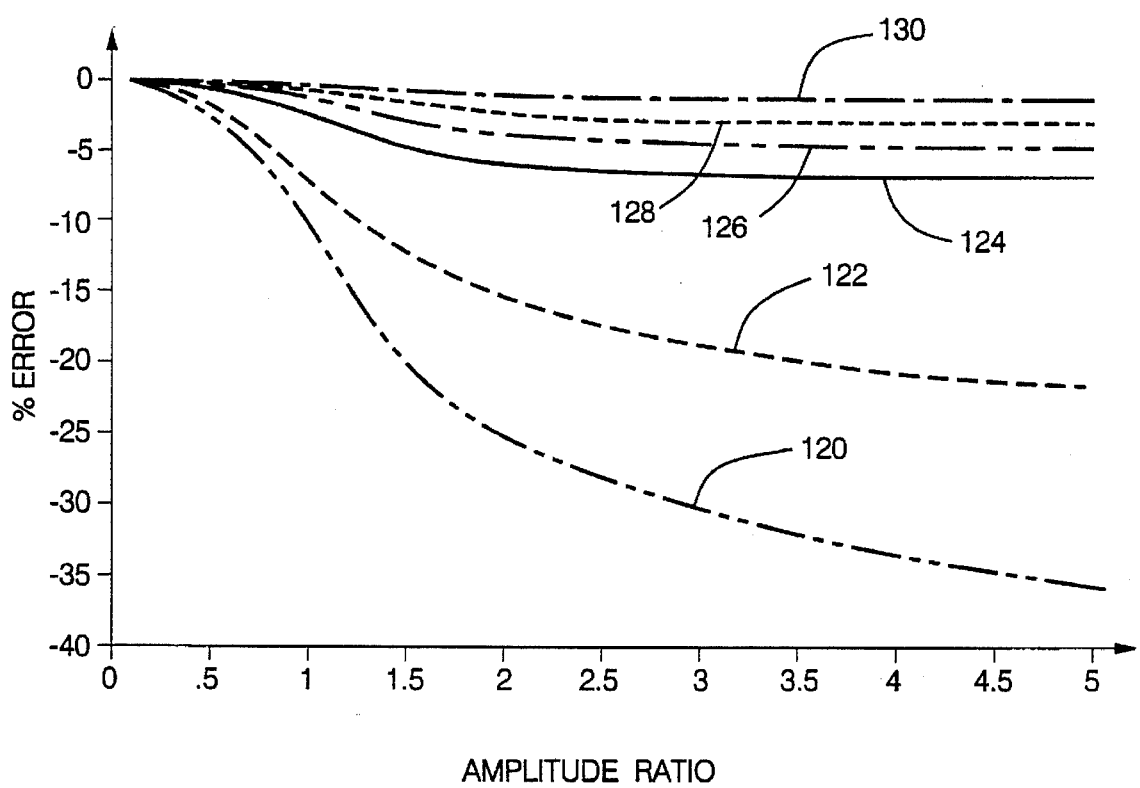
FIG. 11 illustrates the reduction in sensor error using the electronic compensation of FIG. 9.

FIG. 11 compares the percent error for the averages of the uncompensated and the compensated sensor outputs measuring 10 g/s of mass air flow with pulses of 20, 40 and 60 Hz. The sensor used has a 2.7 ms time constant. Traces 120, 122 and 124 represent the plots of percent error versus amplitude ratio for the uncompensated 60 Hz, 40 Hz, and 20 Hz air flow measurements, respectively, and traces 126, 128 and 130 illustrate, for the same air flow measurements, the percent error versus amplitude ratio of the compensated sensor output according to this invention. The figure shows the drastic reduction in error of the sensed average air flow using the compensation system and method according to this invention. Even for an amplitude ratio of 5, the 60 Hz signal represented by trace 126 has only a −5% error. In FIG. 11, the high pass filter time constant is purposefully set at 2.5 ms, slightly below the 2.7 ms time constant of the sensor to show that even when the high pass filter time constant does not exactly match that of the sensor, this invention still provides drastic improvements in the signal output. Similar variations may occur in mass produced systems due to manufacturers' tolerances of the sensor and/or the circuit elements. The error represented by traces 126, 128 and 130 is further reduced by more closely matching the high pass filter time constant to that of the sensor. This may be achieved by tuning the high pass filter to the individual sensor used.

Figure 12:
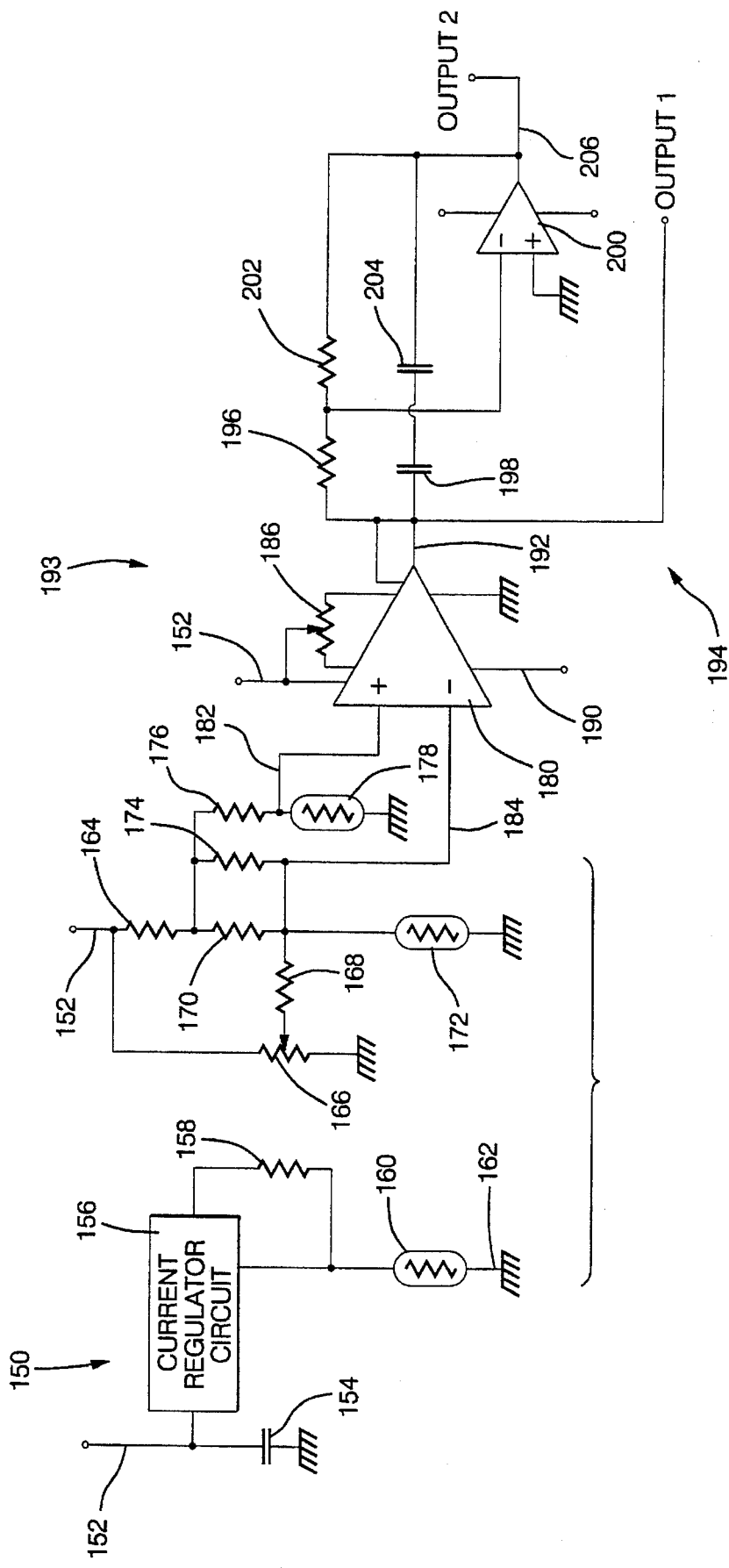
FIG. 12 illustrates a circuit example for implementing the electronic compensation according to this invention.

Referring now to FIG. 12, an example circuit for operating the mass air flow sensor according to this invention is shown. The circuit comprises two sections, heating circuit 150 and sensing circuit 193. The heating circuit receives power from line 152 and provides that power through capacitor 154 to current regulator circuit 156, which energizes, through resistor 158, the sensing device's heating element 160. The heating element responsively generates heat that is sensed by the two thermistors 172 and 178.

The thermistors 172 and 178 are part of a bridge circuit connected between the power supply line 152 and ground that also includes resistors 164, 166, 170, 174 and 176. Resistor 166 is included as a tuning resistor for calibration purposes.

The bridge circuit has two output lines 182 and 184 whose signals vary responsive to the temperature of thermistors 178 and 172, respectively. Differential amplifier 180 receives the signals from lines 182 and 184 at the non-inverting and inverting inputs, respectively. The differential amplifier 180 receives power from the +V and −V voltage supply lines 152 and 190 and has an input offset calibratable through tuning resistor 186. An example suitable integrated circuit amplifier for use as amplifier 180 is an AD624BD differential amplifier available from Analog Devices™.

The single output from the amplifier 180 on line 192 represents the difference between the signals on lines 182 and 184 and corresponds, for example, to trace 72 in FIG. 4. The high pass and low pass filtering stages, according to this invention, are implemented through operational amplifier 200, resistors 196 and 202 and capacitors 198 and 204. Resistor 196 and capacitor 198 have example values of 17.43K and 0.103 µF, respectively, and set the time constant of the high pass filter portion of the amplifier equal to $R_{196} \cdot C_{198}$, which in this example equals 1.8 ms. Resistor 202 and capacitor 204, having example values of 23.3K and 0.010 µF, respectively, comprise the low pass filter stage according to this invention having an example time constant of 0.24 ms.

The amplifier stage 194 thus amplifies the signal on line 192 with a high pass filter function to build back up the high frequency component of the sensor output signal on line 192 by providing the time constant $\tau_1$ substantially equal to the sensor time constant $\tau_{sensor}$ to substantially cancel the low pass filter function of the sensor. By including the low pass filter stage with the time constant $\tau_2$ equal to 0.24 ms, which is substantially smaller than $\tau_1$ or $\tau_{sensor}$, noise from the sensor output is attenuated instead of amplified. Because $\tau_2$ is so small, it has little effect on the sensor output for mass air flow measurements with frequency components in the ranges experienced in internal combustion engine induction systems. Thus, the output signal on line 206 is the compensated sensor output signal that substantially represents an accurate measurement of mass air flow sensed by the sensor.

The output signal on line 206 can then be processed in a known manner, for example, using a function generator programmed with the static calibration curve trace 16, FIG. 2, to convert the signal on line 206 to a mass air flow measurement such as trace 110 in FIG. 10. The function generator may be a simple look-up table or may be implemented in circuit or microprocessor algorithm form in a manner known to those skilled in the art as the system designer desires and therefore, a detailed description thereof need not be set forth herein.

The control circuit for energizing the heating element 160 may be implemented in a manner known to those skilled in the art so that the heating device temperature is consistently a predetermined temperature difference, ΔT, above ambient temperature. By implementing such known heating element control in the circuit shown in FIG. 12, the system automatically adjusts to changes in ambient temperature so that the output signal is accurate regardless of the ambient temperature of the air flowing past the sensor.

The advantages of copending application, Attorney Docket No. H-195143, filed concurrently with this invention and assigned to the assignee of this invention may also be used with this invention.

I claim:

1. A mass air flow measurement system comprising:

a sensing device located in an air flow duct providing an output signal relational to an amount of mass air flow past the device, wherein the sensing device has an inherent sensor response time constant and acts to low pass filter the output signal; and a first filter stage coupled to the output of the sensing device receiving the output signal, wherein the first filter stage comprises a high pass filter with a first filter time constant substantially equal to the sensor response time constant and provides, at a first filter output, a high pass filter output signal, wherein the first filter stage compensates for inaccuracies in the output signal caused by the inherent sensor response time constant when the mass air flow past the device pulses cyclically at time periods on an order of or less than the inherent sensor response time constant.

2. A mass air flow measurement system according to claim 1, also comprising:

a second filter stage coupled to the first filter output and receiving the high pass filter output signal, wherein the second filter stage is a low pass filter with a second filter time constant substantially smaller than the inherent sensor response time constant and provides, at a second filter output, a compensated sensor output signal, wherein the second filter attenuates noise in the high pass filter output signal while maintaining an increased operating bandwidth of the mass air flow measurement system, wherein the compensated sensor output signal is a substantially accurate representation, in both real time and in average, of the mass air flow past the sensor.

3. A mass air flow measurement system according to claim 1, wherein the first filter time constant is in the range of 1 to 3 ms.

4. A mass air flow measurement system according to claim 2 wherein the second filter time constant is in the range of 0.1–0.6 ms.

5. A mass air flow measurement method according to the steps of:

placing an upstream minus downstream temperature air flow sensor in a flow of a gas, wherein the sensor has a sensor time constant;

receiving an output signal from the sensor responsive to a mass flow amount of the gas that flows past the sensor, wherein when the gas pulses with cycle times approaching and below the sensor time constant, the sensor output lags the flow and on average is below an accurate average of the mass flow amount; and high pass filtering the sensor output with a high pass filter, wherein the high pass filter has a zero with a time constant substantially equal to the sensor time constant, wherein the high pass filter effectively amplifies high frequency portions of the sensor output signal and compensates for the lag and low average of the sensor output to gas pulses with cycle times approaching and below the sensor time constant, wherein, an output of the high pass filter is, on avenge, substantially equal to the accurate average of the mass flow amount.

6. A mass air flow measurement method according to claim 5, also comprising the step of:

low pass filtering the output of the high pass filter with a low pass filter, wherein the low pass filter has a pole with a time constant substantially less than the sensor time constant, wherein the low pass filter attenuates sensor noise effectively amplified by the high pass filter.

7. A mass air flow measurement system comprising:

a bi-directional upstream minus downstream temperature flow sensor with an inherent sensor time constant, wherein the sensor has an output signal and wherein the sensor time constant causes the sensor to have a low pass filter effect acting as a single pole low pass filter wherein flow pulses having cycle times approaching and below the sensor time constant are represented in an attenuated state in the sensor output signal;

a high pass filter including a zero and a high pass filter time constant substantially equal to the sensor time constant, wherein the high pass filter compensates for the low pass filter effect of the sensor and wherein, in a high pass filter output signal, the flow pulses having cycle times approaching and below the sensor time constant are not represented in the attenuated state, wherein the flow pulses having cycle times approaching and below the sensor time constant are substantially fully represented.

8. A mass air flow measurement system according to claim 7, also comprising a low pass filter coupled to the high pass filter output signal, wherein the low pass filter has a pole with a time constant substantially less than the sensor time constant, wherein the low pass filter prevents the high pass filter from increasing a noise-to-signal ratio by effectively amplifying sensor noise, wherein a low pass filter output is a substantially accurate representation of flow and wherein a bandwidth of the sensor is increased.

* * * * *